United States Patent [19]
Akers

[11] 4,078,522
[45] Mar. 14, 1978

[54] THREE-DIMENSIONAL AQUARIUM COVER

[76] Inventor: Scott Peter Akers, 1515 Ft. Davis Pl., SE., Washington, D.C. 20021

[21] Appl. No.: 727,609

[22] Filed: Sep. 28, 1976

[51] Int. Cl.² .......................................... A01K 64/00
[52] U.S. Cl. ................................................... 119/5
[58] Field of Search ...................... 119/5; D30/6-12

[56] References Cited

U.S. PATENT DOCUMENTS

| D. 92,776 | 7/1934 | Shannon | D30/9 |
|---|---|---|---|
| D. 231,786 | 6/1974 | Burnley | D30/12 |
| 2,776,642 | 1/1957 | Sepersky | 119/5 |
| 3,244,145 | 4/1966 | Braunhut | 119/5 |
| 3,841,267 | 10/1974 | Miller | 119/5 |

Primary Examiner—Hugh R. Chamblee
Attorney, Agent, or Firm—Harold L. Stowell

[57] ABSTRACT

A three-dimensional aquarium cover is molded or formed from translucent plastic and includes a peripheral base member having upstanding corner support members and a mating top member, the top member having relatively wide, vertically depending peripheral edges to conceal a lighting fixture and a decorative hollow structure formed in conjunction with the top member to conceal an aquarium pump.

2 Claims, 3 Drawing Figures

U.S. Patent  March 14, 1978  4,078,522
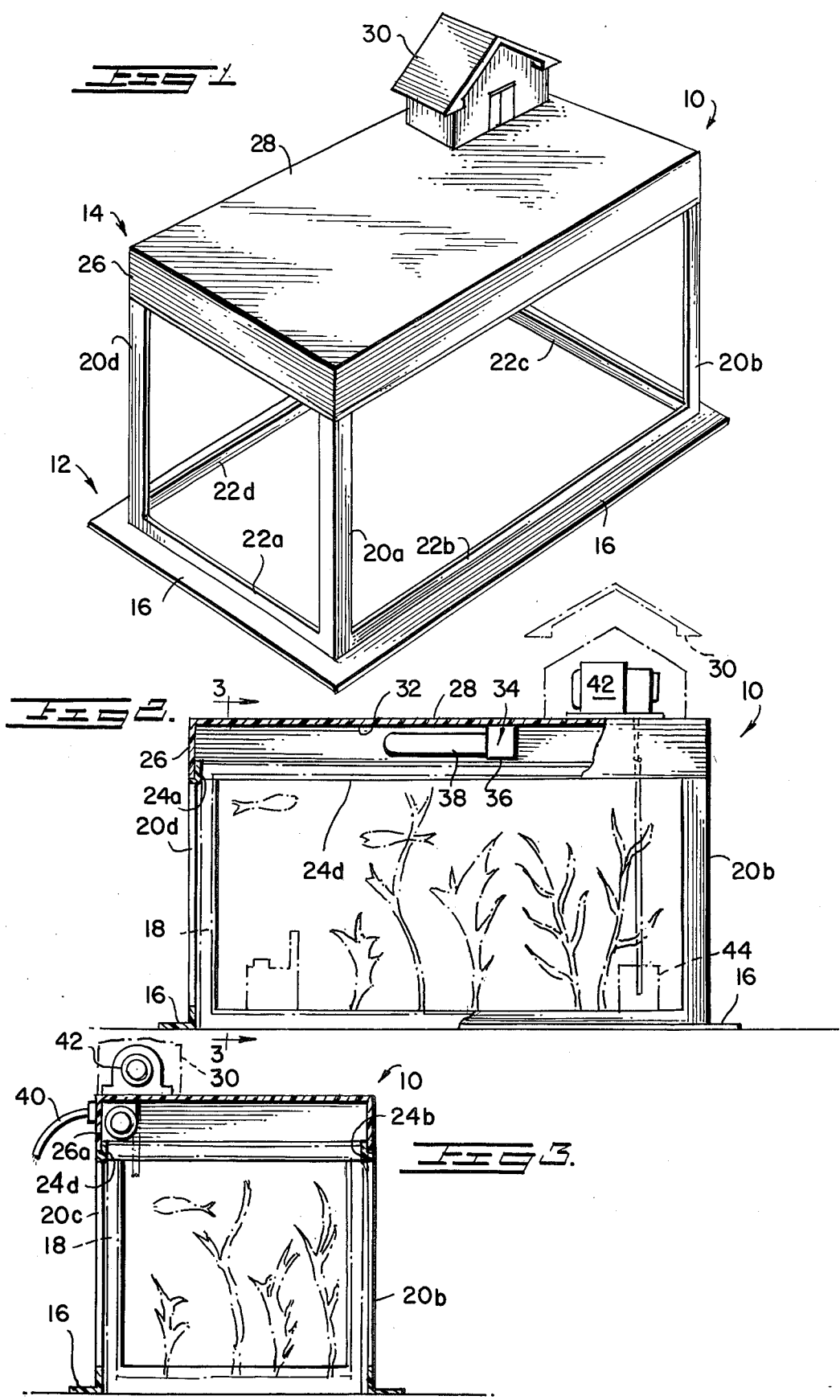

THREE-DIMENSIONAL AQUARIUM COVER

CROSS-REFERENCE TO RELATED APPLICATION

Related subject matter is shown and claimed in my co-pending Design application Ser. No. 727,601 filed Sept. 28, 1976, now U.S. Pat. No. Des. 246,194.

BACKGROUND OF THE INVENTION

1. Field of the Invention

The present invention relates to improvements in aquariums and, more particularly, to a three-dimensional cover having both functional and design features.

2. Description of the Prior Art

It is known in the art to provide aquariums with two and three dimensional internal displays and with two and three dimensional floating aquatic structures which may have functional features such as for sanctuaries for small fish and the like.

Representative patents to such structures are: U.S. Pat. No. 475,404 — Lochmann; U.S. Pat. No. 3,121,417 — Goldman, et al; U.S. Pat. No. 3,327,686 — Holden; and U.S. Pat. No. 3,517,649 — Holden.

SUMMARY OF THE INVENTION

The present invention can be generally described as comprising a three dimensional aquarium cover formed from a plastic composition comprising a base member and a mating top member, each of the members being sized to slip over an aquarium to be covered, the base member including a lower peripheral flange and upstanding corner members, the top member including a relatively wide, vertically depending peripheral edge adapted to engage the upstanding corner members and to conceal a lighting fixture between the top surface of the water in the aquarium and the undersurface of the top member, and a decorative hollow structure formed in conjunction with the top member and adapted to conceal an aquarium pump and the like.

BRIEF DESCRIPTION OF THE DRAWING

The invention will be more particularly described in reference to the accompanying drawing wherein:

FIG. 1 is a perspective view of a form of three dimensional aquarium cover embodying the principals of the present invention;

FIG. 2 is a front elevational view with portions broken away and portions in phantom lines; and FIG. 3 is a section on line 3—3 of FIG. 2.

DESCRIPTION OF THE PREFERRED EMBODIMENTS

Referring to the drawing, 10 generally designates the improved three dimensional aquarium cover comprising the invention. The three dimensional aquarium cover 10 is molded, vacuum formed or the like from relatively thin preferably translucent plastic and the mold for forming the three dimensional cover may be so constructed that in the forming process portions of the three dimensional aquarium cover may be thinner than other portions thereby permitting greater amounts of light to pass therethrough all as to be more fully described hereinafter.

The formed or molded three dimensional cover 10 includes a base portion 12 and a top portion 14. The base portion includes a peripheral base member 16 which forms the major support for the cover. The internal dimensions of the base member 16 is such to freely receive an aquarium 18, FIGS. 2 and 3 of the drawings. The base member also includes four generally vertical upstanding corner support members 20a, b, c and d. Between the corner forming members 20a, b, c and d and the generally horizontal peripheral base member 16 are connecting webs 22a, b, c and d.

Where desired, the upper ends of the corner support members 20a, b, c and d are provided peripheral edge forming members 24a, b, c and d which are generally L-shaped as more clearly shown in FIGS. 2 and 3 of the drawings. Preferably the peripheral base 16 and elements 20a, b, c and d; 22a, b, c and d and 24a, b, c and d are integrally formed.

The top portion 14 of the three dimensional aquarium cover is preferably made separate from the base member 12 so that access to the aquarium can be obtained by lifting the top 14 from its seating engagement with peripheral L-shaped members 24a, b, c and d. However, such separability is not essential as the entire three dimensional aquarium cover 10 could be lifted from the aquarium in order to obtain access thereto.

The top member 14 includes a peripheral side wall 26, a top cover 28 and a hollow structure 30 which in the illustrated form of the invention takes the form of a house. The height of the peripheral wall portion 26 is such that the distance between the inner surface 32 of the top cover 28 and the normal water level in the aquarium 18 is great enough to house and conceal a lighting fixture generally designated 34 and composed of a light socket 36 and a bulb 38. The wall designated 26a of the peripheral wall 26 of the top 14 is provided with a Ferrule to receive a conventional electric supply line 40 for directing power to the light socket 34 and to a pump 42 for supplying air to the filter 44 in the aquarium in a conventional manner.

It will be seen that the top member 14 provides means for maintaining the heat within the aquarium, reduces evaporation of aquarium water and conceals the lighting and aerating and filtering mechanisms for the aquarium while the base member which can be attractively surfaced and colored conceals the structural support members of the aquarium itself. The top surface 28 in addition to supporting the hollow structure 30 may have surface configurations of various and pleasing forms as shown and claimed in my co-pending design application Ser. No. 727,601 filed Sept. 28, 1976.

Further decorative features may include the application of color to the cover and base member thus providing an attractive, relatively inexpensive and functional aquarium cover.

From the foregoing description of a preferred embodiment of the present invention, it will be seen by those skilled in the art that various modifications may be made in the structures without departing from the appended claims such as, for example, a plurality of hollow structures may be supported from the top 28 to house other conventional mechanical elements for supplying heat to the aquarium water and/or timed controlled feeding mechanisms for the fish contained therein.

I claim:

1. A three dimensional aquarium cover formed from a plastic composition comprising a base member and a mating top member, each of said members being sized to slip over an aquarium to be covered, said base member including a lower peripheal flange and upstanding corner members, said top member including a relatively wide, vertically depending peripheral edge adapted to conceal a lighting fixture between the top surface of the water in the aquarium and the under-surface of the top member and a closed decorative hollow structure formed in conjunction with the top member to conceal an aquarium pump, said hollow structure projecting upwardly from said top member and having at least one removable wall.

2. The invention defined in claim 1 including flange members extending between the upstanding corner members and the peripheral flange and further structural members extending about the top of the upstanding corner members and interconnecting said members, each of said further structural members being recessed to receive the lower edge of the peripheral edge of the top member.

* * * * *